Oct. 14, 1958 E. S. SELMER 2,856,595

CONTROL APPARATUS FOR DIGITAL COMPUTING MACHINERY

Filed June 9, 1954 3 Sheets-Sheet 1

INVENTOR.
ERNST S. SELMER
BY James B. Christie
ATTORNEY

Oct. 14, 1958 E. S. SELMER 2,856,595

CONTROL APPARATUS FOR DIGITAL COMPUTING MACHINERY

Filed June 9, 1954 3 Sheets-Sheet 2

INVENTOR.
ERNST S. SELMER

BY James B. Christie

ATTORNEY

INVENTOR.
ERNST S. SELMER
BY James B. Christie
ATTORNEY 2,856,595

CONTROL APPARATUS FOR DIGITAL COMPUTING MACHINERY

Ernst S. Selmer, Oslo, Norway, assignor, by mesne assignments, to Burroughs Corporation, Detroit, Mich., a corporation of Michigan Application June 9, 1954, Serial No. 435,563

6 Claims. (Cl. 340—174)

This invention relates to control apparatus and more particularly to control apparatus for use with a memory system in digital computing machinery, or the like.

With the increasing amount of numerical data upon which complex arithmetic computations must be made, apparatus in the form of digital computing machinery has been devised to perform the arithmetic computations rapidly. Most of this apparatus includes electronic decision elements, e. g., electron tubes, which are capable of performing operations at an extremely fast rate. One limitation, however, has been the rate at which the data to be acted upon can be introduced to the computing machinery. Likewise, a limitation on the speed of operation is the rate at which the results of the arithmetic computations may be derived from the computing machinery. This limitation led to the development of the internally programmed digital computer.

In an internally programmed digital computer, information is fed into the computer where it is stored in an internal memory. In like manner, commands indicating the operations to be performed are introduced into the computer and stored in the memory. A series of arithmetic computations then may be performed in accordance with the commands upon selected pieces of the data, i. e., operands, at a rate which is limited only by the inherent internal rate at which the decision elements can perform their tasks and the rate at which the commands and operands can be derived from the memory.

In one type of memory system, information is stored in blocks along a storage medium. For example, a rotating drum having a magnetizable periphery may be employed as the storage medium and the blocks may be recorded along bands on the periphery of the drum. In some systems a portion of the drum is devoted to bulk storage, while another portion is devoted to the storage of information in such a way that it is accessible more quickly than the information stored in the bulk storage portion. Therefore, where a particular block of information is to be used again and again in a series of computations, the block of information may be transferred from the bulk storage portion to the fast access portion. By this means the time required to locate and derive a particular command or operand from the memory may be reduced.

Ordinarily, a block of information contains a plurality of so-called "words," each of which consists of a multiple-digit number. Each of the words may be recorded in a particular location having an assigned address so that a selected word may be derived by referring to the assigned address. In my co-pending United States patent application, filed on november 9, 1953, Serial no. 391,026, entitled "Coincidence Control Apparatus," I have described a system for locating a selected address and counting the number of words in a block of information to be transferred.

In an internally programmed digital computer, where a block of commands is to be transferred from bulk storage to the fact access portion of a memory system, system, previously it has been necessary to enter a command directing the apparatus to transfer the block of information from one location to another, and to enter a second command, including the new address of the first command of the transferred block, to derive the first of the block of commands transferred.

In accordance with my present invention, I provide improved apparatus in which a selected word is automatically derived and acted upon without the necessity for a separate command to change control to the selected word. This decreases the time required for each such operation by an amount equal to the time required for the derivation of a command and the execution thereof. In addition, the program for computations may be prepared more easily since one of the commands previously required may be omitted.

In a particular embodiment of the invention, an address register is adapted to receive from a command counter the address of a word to be derived from the memory. Where a block of commands is to be transferred from one portion of the memory to another, the address register indicates the address of the first word of the block of information to be transferred. This address is recirculated in the address register as well as shifted into the command counter. When the proper address in the memory has been found, the transfer is initiated and at the conclusion of the transfer, a signal is applied to the command counter to change the address to correspond to the address of a selected word in the memory. The new address in the command counter is then shifted into the address register and as soon as the new address has been located, the selected word of the transferred block is derived, and the normal computing cycle continues.

A better understanding of the invention may be had upon a reading of the following detailed description when taken in connection with the drawings, in which.

Figure 1:
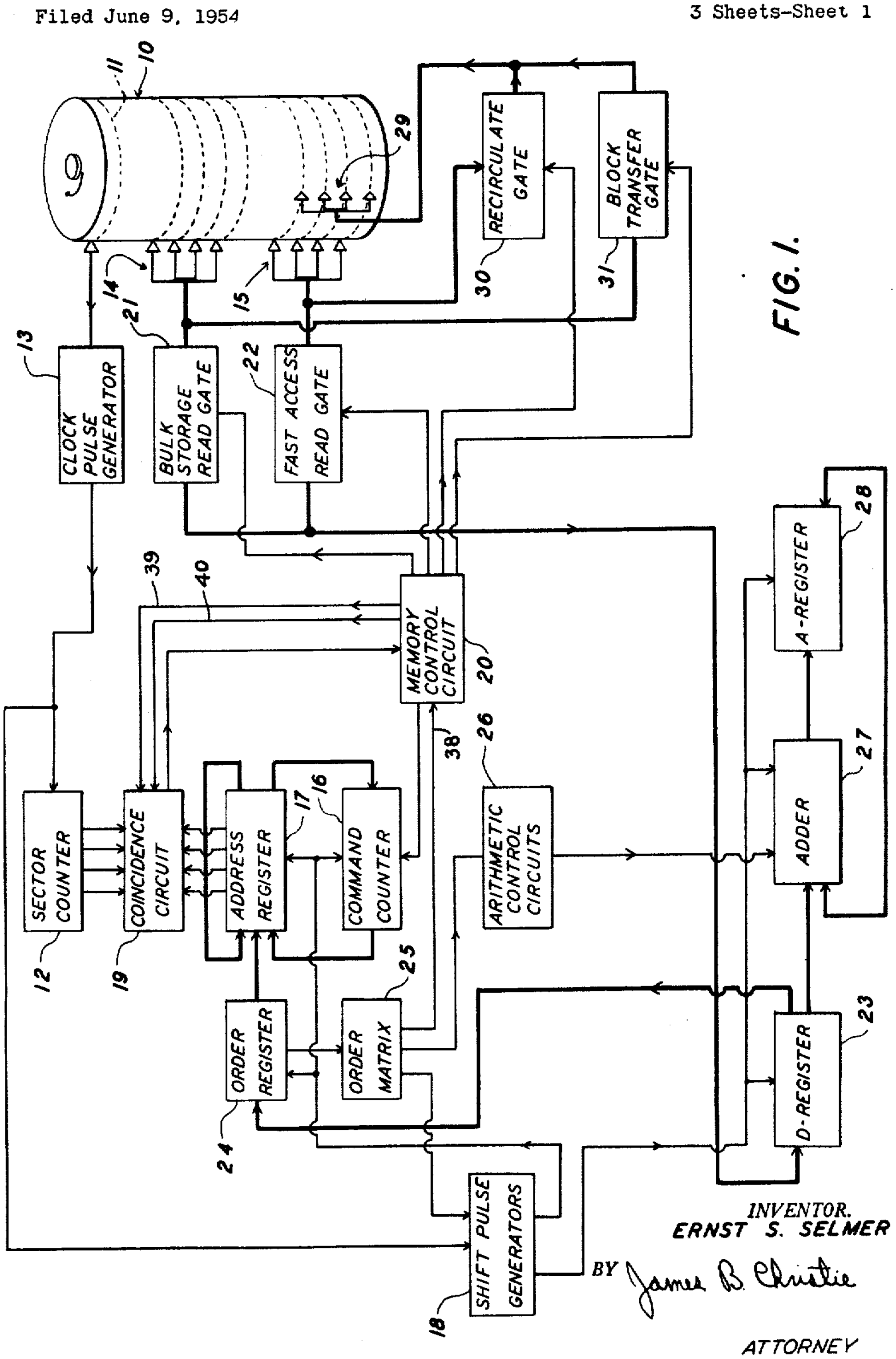
Fig. 1 is a block diagram showing an embodiment of the present invention in a digital computer.

The digital computer of Fig. 1 is of the so-called binary coded decimal type. That is, the individual digits of a number having a plurality of digits are each coded within a binary notation ranging from zero to nine. Where, as in the apparatus of Fig. 1, a decade of four bi-stable circuits is employed to register each decimal digit, the permutations and corresponding decimal digits may be as follows:

| Number | Binary Code | | | |
|---|---|---|---|---|
| | 1 | 2 | 4 | 8 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

where "1" indicates one condition of operation in a bi-stable circuit and "0" indicates another condition of operation.

By coupling a plurality of decades together so that the registration in a particular set of bi-stable circuits forming one decade may be shifted into the bi-stable circuits forming an adjacent decade, a register may be formed in which a number may be represented by introducing the binary coded digits into an end decade, one by one, and thereafter shifting the digits along the decades of the register until a number having a given number of digits is represented in a like number of decades in the register. It might be noted that this type of transfer of information may be termed "parallel" with respect to the individual registrations of "bits" forming the digit, but that it is "serial" with respect to to each of the binary coded decimal digits.

In the apparatus of Fig. 1 the heavy lines indicate signal transfer links capable of passing four binary "bits" simultaneously in time parallel. An internal memory is provided by a conventional rotating magnetic drum 10 which will be assumed to have been previously recorded with commands and operands in separate sectors having distinct addresses around its periphery, the position of each of which is identified by a pulse on a clock track 11. The individual addresses of the magnetic drum 10 may be identified by a sector counter 12, which in response to pulses derived from the clock track 11 via the clock pulse generator 13, keeps step with the instantaneous position of the magentic drum 10, thereby indicating the particular address lying under the magnetic pickup heads 14 and 15.

To initiate the operation of the computer, the address of a particular command may be registered in a command counter 16, from whence it is shifted into the address register 17 under the influence of shift pulses derived from the shift pulse generators 18. When the address registered in the address register 17 is identical to the address registered in the sector counter 12, a coincidence circuit 19 emits a signal indicating that the address of the magnetic drum 10, corresponding to that registered in the address register 17, is under the magnetic pickup heads. This coincidence signal is passed to the memory control circuits 20 which in turn enable either a bulk storage read gate 21 or a fast access read gate 22 to pass the word recorded in the selected address of the magnetic drum 10 to the D-register (operand register) 23. As the binary coded decimal digits are presented to the D-register decade to the extreme left, they are shifted into the D-register under the influence of pulses from the shift pulse generators 18. In one type of digital computer, each word totals ten binary coded decimal digits plus an indication of the sign of the number. This means that the D-register would comprise eleven separate decades, ten for indicating binary coded decimal digits, and one for indicating the sign of the number.

Under the influence of pulses from the shift pulse generators, the command registered in the D-register is shifted into the address register 17 and the order register 24. The address register and order register together may be considered as sections of a single register for storing commands, i. e., a command register. As indicated above, a portion of the derived command represents an order, and this portion is registered in the order register 24, while another portion of the command represents an operand address, and this portion is registered in the address register 17.

It should be noted that as the derived command is being shifted into the order register 24 and the address register 17, the address of the derived command is being shifted out of the address register 17 into the command counter 16. The function of the command counter is to keep track of the command which is being executed, and to indicate the next succeeding command to be derived from the memory. For this reason it includes a counter, as well as a register, so that in the normal computational cycle the numerical address may be increased by one each time the command address is passed through it.

In the normal computational cycle of the computer of Fig. 1, the next operation is to derive the operand residing in the address of the magnetic drum 10 corresponding to the address registered in the address register 17. When the registration in the sector counter 12 corresponds to the address in the address register 17, the coincidence circuit 19 applies a coincidence signal to the memory control circuits 20, which in turn establish a threshold on either the bulk storage read gate 21 or the fast access read gate 22. The threshold on the selected gate enables the gate to pass the word residing under the magnetic pickup heads associated therewith to the D-register 23. The individual digits of the word are shifted into the D-register by means of shift pulses from the shift pulse generators 18 in the same manner as previously described.

An order matrix 25, which is connected to the order register 24, distinguishes between the various computations and manipulations of which the computer is capable, and applies a signal to the arithmetic control circuits 26 when an arithmetic operation is to be performed, which in turn control the operation of the adder 27. In accordance with a particular order, the arithmetic computation is then performed in the adder 27 within which a registration appearing in the A-register 28 may be added or subtracted, digit after digit, from the registration in the D-register 23. A detailed explanation of the operation of the adder, along with the D-register, A-register and the arithmetic control circuits may be found in my co-pending United States patent application, filed on September 25, 1953, Serial No. 382,401, entitled "Electronic Adder," and my co-pending United States patent application, filed on December 17, 1953, Serial No. 398,834, entitled "Digit Pulse Counter."

At the completion of the arithmetic computation, the address registered in the command counter 16 is shifted into the address register 17 and the cycle of operations repeats itself with the deriving of the next command and the execution of that command.

The above-described sequence of operations is that which takes place during a normal computational cycle. It will be appreciated that the access time for deriving information from the magnetic drum via the bulk storage pickup heads 14 may be longer than the actual computation time. For this reason, if a particular series of commands and operands is to be employed again and again, and particularly where a block of commands is to be transferred to a fast access memory and the commands are to be executed one by one commencing with the first, the normal cycle of the computer may be interrupted temporarily to transfer the block of information to the fast access memory.

When an order is registered in the order register specifying a block transfer, a signal is applied to the shift pulse generators 18 from the order matrix 25. The shift pulse generators 18 then cause the address in the address register to be re-circulated and at the same time to be shifted into the command counter 16.

One type of fast access memory is illustrated in the embodiment of Fig. 1. By displacing a magnetic pickup head and a magnetic recording head along a band of the magnetic drum 10, a re-circulating loop may be provided in which the information derived from the band by the pickup heads 15 is passed to the recording heads 29 via the re-circulate gate 30.

The time for a block of information to be re-circulated through the loop takes much less time than a revolution of the magnetic drum 10. Therefore, any given word or command of a block of information in the loop may be located and derived in less time than the average time required to locate and derive a word or command from the bulk storage portion of the magnetic drum 10 associated with the pickup heads 14. When the loop is re-circulating, the re-circulate gate 30 is enabled to pass signals to the recording heads 29 from the pickup heads 15. However, when a block of information is to be transferred from the bulk storage region to the re-circulating loop, the memory control circuits 20 render the re-circulate gate 30 incapable of passing signals. In addition, the memory control circuits 20 enable a block transfer gate 31 to pass signals from the bulk storage magnetic pickup heads 14 to the fast access magnetic recording heads 29.

Assuming that a command has been derived and entered in the order register 24 and the command address register 17 directing a transfer of a block of information from bulk storage to the re-circulating loop, a signal may be derived from the order matrix 25 for energizing the memory control circuits 20 whereby the recirculate gate 30 is disabled and the block transfer gate 31 is enabled to pass signals when a coincidence pulse is supplied by the coincidence circuit 19.

The memory control circuits 20 may include an access circuit which is actuated whenever it is desired to derive information from the magnetic drum 10, a loop/main circuit for identifying whether information is to be derived from the bulk storage portion or the fast access portion, and an action circuit for initiating the deriving of the information in response to a coincidence pulse. These circuits may be actuated in accordance with the order in the order register by means of a signal from the order matrix 25.

In addition to establishing suitable threshold potentials on the bulk storage read gate 21, the fast access read gate 22, the re-circulate gate 30 and the block transfer gate 31, the access circuit of the memory control circuits 20 is connected to the coincidence circuit 19. When access to the information on the magnetic drum 10 is to be had, as indicated by the access circuit, the coincidence circuit 19 is enabled to pass a first coincidence signal which is generated when the sector counter 12 indicates that the address appearing under the pickup heads 14 corresponds to the address registered in the address register 17.

This signal, when applied to the memory control circuits, energizes the action circuit to initiate the transfer of the block of information from the bulk storage area via the pickup heads 14 to the recording heads 29 of the re-circulating loop. In addition, the first coincidence signal is applied to the loop/main circuit which in turn applies a signal to the coincidence circuit 19, thereby disabling the portion of the coincidence circuit 19 which senses the binary components of a binary coded number in excess of a number of words comprising a block of information.

When a complete block of information has been transferred, a second coincidence signal is supplied by the remaining portion of the coincidence circuit 19 which was not disabled by the signal from the loop/main circuit. This causes the action circuit, the access circuit and the loop/main circuit of the memory control circuits to return to their initial positions. In turn, the bulk storage read gate 21, the block transfer gate 31 and the re-circulate gate 30 are returned to their initial conditions, whereby a transferred block of information may be re-circulated in the aforementioned manner.

At the completion of the block transfer, the address registered in the command counter is the address in the bulk storage portion of the memory of the first word transferred.

Ordinarily, in the operation of a computer it is desirable that the next operation to be performed be the execution of the first command of the transferred block. Therefore, I have discovered that by altering the address registered in the command counter in response to the second coincidence signal to indicate the address of the block of information in the fast access portion of the memory, a separate command need not be employed to transfer control to the commands of the transferred block.

In order to derive a pulse to be applied to the command counter 16, a pulse may be derived from the memory control circuits 20 in response to the second coincidence signal. Of course, the pulse should be applied to the command counter 16 only when an automatic block transfer order is registered in the order register 24 and it is desired to derive the first word of the transferred block of information immediately succeeding the block transfer itself.

After the pulse has been applied to the command counter and the address residing therein modified to be the address of the first transferred command of the transferred block, the address in the command counter is shifted into the address register and a coincidence signal is provided by the sector coincidence circuit 19 when the modified address in the address register corresponds to the address in the sector counter 12. This coincidence signal is applied to the memory control circuits 20, which in turn energize the fast access read gate 22 through which the command residing under the magnetic pickup heads 15 of the re-circulating loop may be transferred to the D-register 23.

The derived command is then shifted into the order register 24 and the address register 17, and the command is executed in the normal fashion discussed previously.

Therefore, by altering the address in the command counter 16 when the second coincidence signal is provided by the coincidence circuit 19, the transfer of control to the first command of a transferred block of commands is accomplished automatically.

Figures 2, 4:
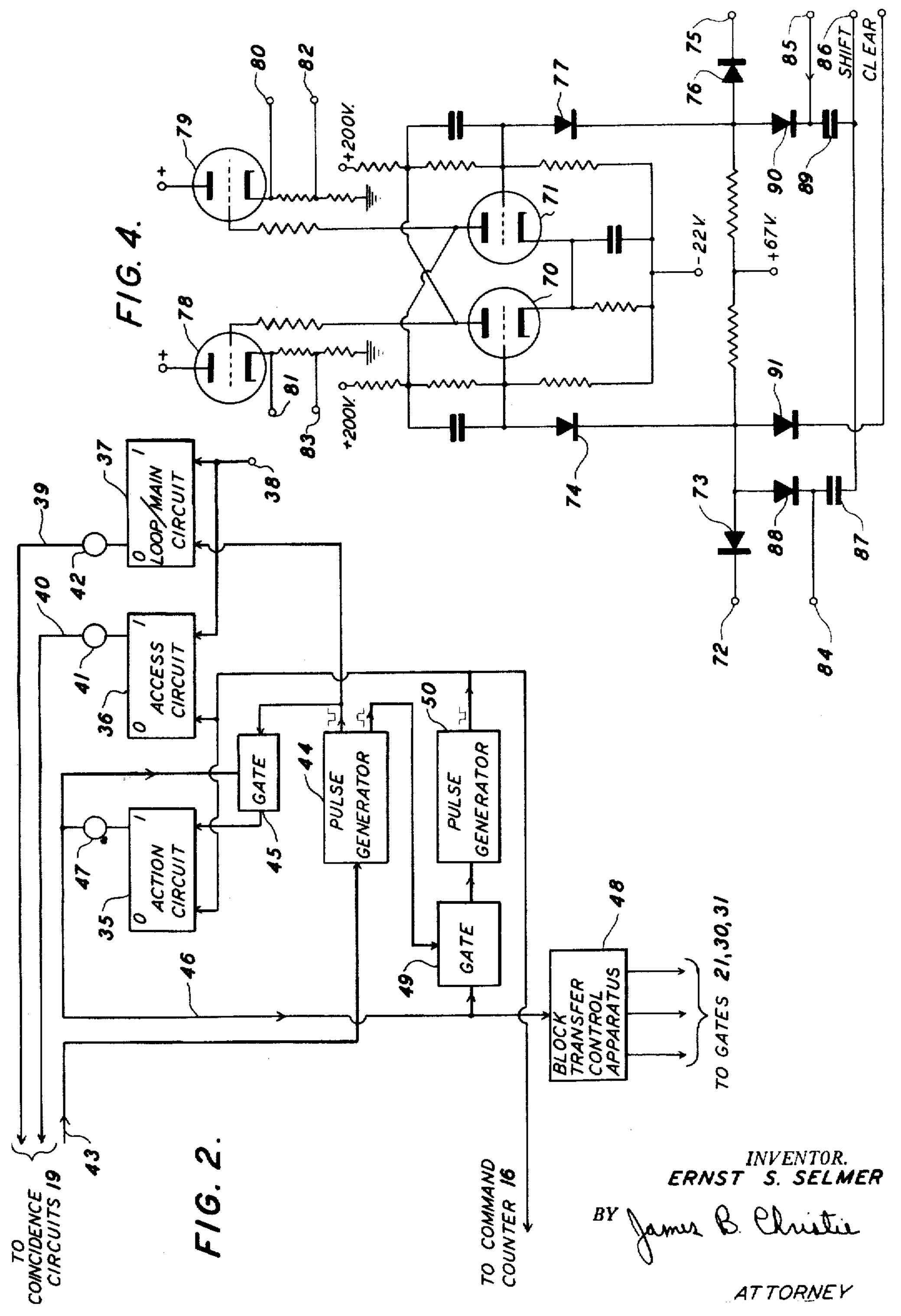
Fig. 2 is a block diagram of a portion of the apparatus of Fig. 1 corresponding to the memory control circuits.
Fig. 4 is a schematic circuit diagram of apparatus which may be used in the registers and the counters of Fig. 1.

Fig. 2 shows one type of apparatus which may be used to perform some of the functions of the memory control circuits 20 of Fig. 1. The action circuit 35, the access circuit 36, and the loop/main circuit 37 may each comprise a conventional bi-stable circuit of the Eccles-Jordan variety.

It will be assumed that a negative pulse applied to the left hand side of each of the circuits 35, 36 and 37 will cause the particular circuit to which the pulse is applied to assume the "0" condition. In like manner a negative pulse applied to the right hand side will cause the circuit to which the pulse is applied to assume the "1" position. Also, it will be assumed that when each of the circuits is in its "0" condition, a relatively high potential is available on its "0" side and a relatively low potential is provided on its "1" side. Likewise, when each of the circuits is in its "1" position, a relatively low potential is provided on its "0" side, while a relatively high potential is provided on its "1" side.

When a signal is applied to the terminal 38 from the order matrix 25 of Fig. 1, indicating that a block transfer operation is to be performed, the loop/main circuit 37 is placed in its "1" condition. This causes the lead 39 to assume a relatively low potential. The block transfer signal also is applied to the access circuit 36, which causes the lead 40 to assume a relatively high potential. A cathode follower 41 may be connected to the output of the access circuit 36 and a cathode follower 42 may be connected to the output of the loop/main circuit 37 in order to isolate the access circuit from the lead 40 and the loop/main circuit from the lead 39.

The relatively high potential appearing on the lead 40 and the relatively low potential appearing on the lead 39 may be passed to the coincidence circuit 19 of Fig. 1. This activates the coincidence circuit so that as soon as coincidence is established between the registration in the sector counter 12 and the registration in the address register 17, a cincidence signal is supplied which is returned to the memory control circuitry of Fig. 2 via a lead 43.

A coincidence signal on the lead 43 may be applied to a pulse generator 44 which applies a suitable pulse to the loop/main circuit 37 to place it in its "0" condition. This causes the lead 39 to assume a relatively high potential which disables a portion of the coincidence circuit 19, a detailed description of which is given below.

In addition, a pulse from the pulse generator 44 is passed to a gate 45 which is adapted to be rendered conducting when the action circuit 35 is in its "0" condition. Assuming that the action circuit 35 is in its "0" condition, the pulse from the pulse generator 44 is passed to the "1" side of the action circuit 35 via the gate 45. This causes the action circuit 35 to assume its "1" condition, thereby causing the lead 46 to assume a relatively high potential. A cathode follower 47 may be included in the output of the action circuit 35 to isolate the lead 46 from the action circuit 35, if desired. The relatively high potential of the lead 46 is applied to a block transfer control apparatus 48 which is adapted to establish suitable threshold potentials on the bulk storage read gate 21, the re-circulate gate 30 and the block transfer gate 31 of Fig. 1 for initiating a block transfer.

In addition, a threshold is established on the gate 49 which is adapted to be rendered conducting when the lead 46 is at a relatively high potential. When a block of information has been transferred, the coincidence circuit 19 provides a second coincidence signal on the lead 43, which is passed to the pulse generator 44. The pulse generated by the pulse generator 44 in response to the second coincidence signal has no effect upon the action circuit 35 since the gate 45 is rendered non-conducting. Also, since the loop/main circuit 37 is in its "0" condition, the pulse provided by the pulse generator 44 has no effect upon that circuit. However, the pulse generated in response to the second coincidence signal is passed by the gate 49 which is in position for conduction. The pulse is passed to a pulse generator 50 which generates a pulse which is applied to the "0" side of the action circuit 35 and the access circuit 36. This causes the lead 46 to assume a relatively low potential in response to which the block transfer control apparatus 48 returns the bulk storage read gate 21, the re-circulate gate 30 and the block transfer gate 31 to their initial condition, whereby the transferred block is re-circulated in the fast access portion of the memory drum 10 of Fig. 1.

In order to change the address registered in the command counter 16 of Fig. 1 to correspond to the new address of a selected one of the words of the transferred block in the fast access memory, the pulse from the pulse generator 50 may be applied to the command counter 16.

Briefly, the apparatus of Fig. 2, in response to a signal at the terminal 38 indicating that a block transfer operation is to be performed, provides suitable signals from the block transfer control apparatus 48 for energizing the bulk storage read gate 21, the re-circulate gate 30 and the block transfer gate 31 of Fig. 1, and in addition, generates a pulse in response to the second coincidence signal occurring at the end of a block transfer operation which is applied to the command counter 16.

Figure 3:
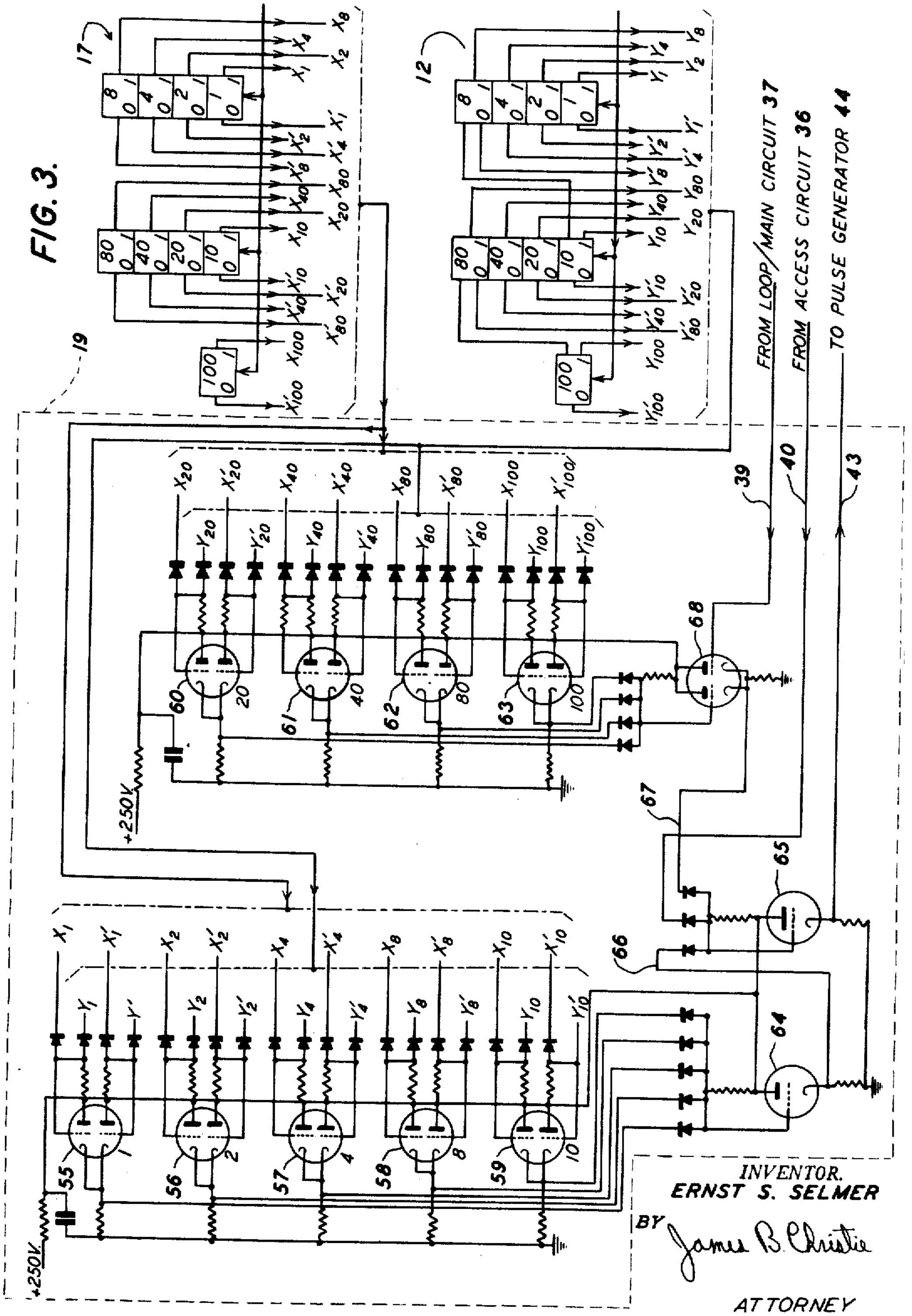
Fig. 3 is a schematic circuit diagram of apparatus for use as a coincidence circuit.

Fig. 3 shows one suitable form of apparatus for performing the function of the coincidence circuit 19 along with a portion of the address register 17 and a portion of the sector counter 12. In the sector counter, the output from the "1" side of the respective blocks, each of which may include a conventional bi-stable circuit, is represented by Y and a subscript denoting the binary number which the circuit is adapted to register. The output from the "0" side of the respective circuits is represented by Y′ and a corresponding subscript. When a bi-stable circuit is in the "0" state, the Y′ lead assumes a relatively high potential, and when a circuit is in the "1" state, the Y lead assumes a relatively high potential. The bi-stable circuits of the address register 17 are labeled in a corresponding manner using X and X′.

The left hand portion of the coincidence circuit 19 includes five comparator tubes 55–59 which sense coincidence in the conditions of conduction of the 1, 2, 4, 8 and 10 circuits of the address register 17 and the sector counter 12. The right hand portion of the coincidence circuit 19 includes four comparator tubes 60–63 which sense coincidence in the conditions of conduction of the 20, 40, 80 and 100 circuits of the address register 17 and the sector counter 12.

The circuitry associated with each comparator tube includes four diodes and is arranged so that the cathode of the comparator tube assumes a relatively low potential except when its associated pair of X and Y leads, or its associated pair of X′ and Y′ leads, are at high potential. The comparator tubes serve to compare the state of activation in the corresponding circuits of sector counter 12 and the address register 17, and when corresponding circuits are in the same state the cathode of the corresponding comparator tube assumes a relatively high potential.

A gate tube 64 is coupled to the cathode of the comparator tubes 55–59 through five diodes and the circuit is arranged so that the cathode of the tube 64 assumes a relatively high potential only when all of the cathodes of the tubes 55–59 are at a relatively high potential. Another gate tube 65 is controlled by the potential on the leads 40, 66 and 67 so that its cathode, and hence the lead 43, is at a relatively high potential only when the leads 40, 66 and 67 are at a relatively high potential.

A gate tube 68 is coupled to the cathodes of the comparator tubes 60–63 through four diodes and the circuit is arranged so that the cathode of the tube 68 assumes a relatively high potential only when all of the cathodes are at a relatively high potential, or when the lead 39 assumes a relatively high potential.

When a block transfer is initiated and the loop/main circuit 37 of Fig. 2 causes the potential on the lead 39 to assume a relatively low potential, the potential on the lead 67 assumes a relatively high potential when the conditions of activation or conduction of the 20, 40, 80 and 100 circuits of the address register 17 and the sector counter 12 are the same. Also, the lead 66 assumes a relatively high potential when the conditions of activation of the 1, 2, 4, 8 and 10 circuits of the address register 17 and the sector counter 12 are the same. Since the lead 40 is held at a relatively high potential when a block transfer is initiated, a relatively high potential appears across the cathode resistor associated with the gate tube 65, thereby causing the lead 43 to assume a relatively high potential. This change in potential of the lead 43 may be applied directly to the pulse generator 44. However, in the type of apparatus in which operations are performed synchronously with clock pulses, it is preferable to apply the change in potential on the lead 43 to an intermediate gate (not shown) to which are applied the clock pulses. The potential on the lead 43 then provides a threshold on the gate for passing the next succeeding clock pulse, which in turn energizes the pulse generator 44.

As was previously described with respect to Fig. 2, when the block transfer has been initiated, the lead 39 assumes a relatively high potential. This causes the voltage across the cathode resistor associated with the gate tube 68 to increase, thereby placing a relatively high potential on the lead 67, irrespective of the condition of conduction of the comparator tubes 60–63.

With respect to the comparator tubes 55–59, a coincidence is established when the 1, 2, 4, 8 and 10 circuits of the address register 17 and the sector counter 12 are in the same condition of activation. This causes the lead 43 to assume a relatively high potential since the lead 67 and the lead 40 are likewise held at a relatively high potential. In the particular circuitry shown, the period between the time when the lead 43 initially assumes a relatively high potential in accordance with the first coincidence, and the time when the lead 43 assumes a relatively high potential in response to a second coincidence, is twenty counts of the sector counter 12. This corresponds to a block of information including twenty words to be transferred. However, it will be appreciated that suitable coincidence circuits can be constructed to provide the requisite coincidence signals for blocks of information including any desired number of words.

The apparatus shown in the schematic circuit diagram of Fig. 4 is an example of one type of circuitry which may be employed as a bi-stable circuit in the registers and counters of Fig. 1. The circuit includes two electron tubes 70 and 71 which are cross-coupled in a manner similar to an Eccles-Jordan multivibrator. The circuit is bi-stable so that one of the electron tubes 70 and 71 is maintained conducting, while the other of the electron tubes is non-conducting.

Asssuming that the electron tube 70 is conducting, and the electron tube 71 is cut off, a negative pulse applied to the terminal 72 is coupled to the control electrode of the electron tube 70 via the diodes 73 and 74. This decreases the conduction in the electron tube 70, thereby causing the potential at the anode to go positively. This positive excursion is coupled to the control electrode of the other electron tube 71 which tends to render that electron tube conducting, thereby causing the potential at the anode of the electron tube 71 to decrease. This decrease in potential is in turn coupled to the control electrode of the electron tube 70, thereby causing a cumulative action which ultimately results in the electron tube 71 being rendered conducting, and the electron tube 70 being rendered non-conducting. In like manner, when a negative pulse is applied to the terminal 75, it is coupled to the control electrode of the electron tube 71 via the diodes 76 and 77, thereby tending to render the electron tube 71 non-conducting, which ultimately results in the electron tube 70 being rendered conducting and the electron tube 71 being rendered cut off.

Output voltages may be derived from the cross-coupled electron tubes 70 and 71 by means of conventional cathode follower electron tubes 78 and 79. Inclusion of cathode followers on the output of the bi-stable circuit minimizes the effect which the output circuits may have upon the bi-stable circuit. As shown, an output voltage may be derived from the cathode of the electron tube 79 at a terminal 80. The voltage appearing at the terminal 80 represents the condition of conduction in the electron tube 71. That is, when the electron tube 71 is conducting, the terminal 80 is at a relatively low potential, and when the electron tube 71 is cut off, the voltage appearing at the terminal 80 is relatively high. In like manner, the voltage appearing at a terminal 81 connected to the cathode of the electron tube 78 represents the condition of conduction of the electron tube 70.

By means of the terminals 82 and 83, which are connected to intermediate points on the cathode resistors of the cathode follower electron tubes 78 and 79, voltages may be derived which are of less magnitude than those appearing at the terminals 80 and 81.

To form a decade for use in the registers or counters of the apparatus of Fig. 1, four of the bi-stable circuits of Fig. 4 may be used. Where the decades are employed to form a register in which it is possible to shift the registration in one decade to an adjacent decade, the voltages appearing at the terminals 82 and 83 may be connected to a bi-stable circuit of an adjacent decade. The bi-stable circuit of Fig. 4 is adapted to receive the voltages from a bi-stable circuit of an adjacent decade at the terminals 84 and 85.

When a negative shift pulse is applied to the terminal 86 and the voltage appearing at the terminal 84 is relatively low, the shift pulse is applied to the control electrode of the electron tube 70 via a capacitor 87, a diode 88 and the diode 74. This causes the bi-stable circuit to assume that condition where the electron tube 70 is cut off, and the electron tube 71 is conducting. In like manner, when the voltage applied to the terminal 85 is relatively low, and a negative shift pulse is applied to the terminal 86, the shift pulse is passed to the control electrode of the electron tube 71 via a capacitor 89, a diode 90 and the diode 77. This causes the bi-stable circuits to assume that condition where the electron tube 70 is conducting and the electron tube 71 is cut off.

Where it is desired to clear the registration in all the bi-stable circuits of the register, a clear pulse may be applied to one of the electron tubes of each of the bi-stable circuits by some suitable means such as a diode 91.

In the command counter 16 of Fig. 1, a plurality of decades, each of which comprises four bi-stable circuits similar to that shown in Fig. 4, are connected so that the registration in one decade may be shifted into an adjacent decade. By interconnecting the bi-stable circuits of one of the decades to form a counter as well as a register, the command counter may be adapted to count up one during the normal cycle of the computer in which the command counter keeps track of the address of the next command to be fetched from the memory drum 10.

In accordance with my present invention, the pulse generated in response to the second coincidence signal may be applied to selected ones of the bi-stable circuits of the command counter. Where it is desired to set the bi-stable circuit in one condition, the second coincidence pulse may be applied to the terminal 72. On the other hand, where it is desired to set the bi-stable circuit in its other condition of operation, the second coincidence pulse may be applied to the terminal 75. By applying the second coincidence pulse to selected ones of the bi-stable circuits, any address may be selected which corresponds to the assigned address of a selected word of the block of information transferred to the fast access memory.

In one successful embodiment, the first two digits of the address of all words in the fast access memory begin with 70. This means that the pulse applied to the command counter 16 sets the decade of the command counter registering the most significant digit to seven, and the decade of the command counter registering the next most significant digit to zero. A four digit address was employed so that the registration in the decades containing the least two significant digits was left unaltered.

In the case where the first word of a transferred block of information is the one to be derived immediately after a block transfer operation, the apparatus may be modified to eliminate the necessity for scanning the memory after the block transfer operation for deriving the first word. This results in a saving of the time normally required to fetch a word from the portion of the memory to which the block is transferred.

With respect to Fig. 1, the apparatus may be as described above except that the memory control circuits 20 are adapted to render the fast access read gate capable of passing the first word of the transferred block when it appears under the fast access pickup heads 15. The first word then may be shifted into the D-register 23 under the influence of shift pulses from the shift pulse generators 18.

Where the words of the transferred block are to be derived in consecutive order, the pulse generated in response to the second coincidence signal may be applied to the command counter 16 so as to change its registration to correspond to the second word of the transferred block.

With respect to the actual circuitry involved, this modification for saving the time required to derive the first word from the transferred block may be accomplished by modifying the memory control circuits 20 in a suitable manner to place a threshold potential on the fast access read gate 22 at the proper time.

In one embodiment, the time required for the first word of information recorded by the fast access recording heads 29 to reach the fast access reading heads 15 is approximately twenty word times. This means that the memory control circuits 20 should be adapted to energize the fast access read gate 22 approximately twenty word times after the block transfer gate 31 is initially energized for a block transfer. If amplifiers or other circuitry are included which introduce an added time delay, the time at which the fast access read gate 22 is energized may be somewhat different.

With respect to the command counter 16, the pulse generated in response to the second coincidence signal may be applied to any combination of selected bi-stable circuits. Therefore, the registration in the command counter 16 may be made to correspond to the address of the second word of the transferred block, if desired. Where the words of the transferred block are to be derived in non-consecutive order, or if control is to be passed to a word or command in another part of the memory, the registration in the command counter 16 may be suitably altered by the pulse generated in response to the second coincidence signal.

Another way in which the apparatus may be modified to derive the first word of a transferred block of information immediately after a block transfer operation, is to alter directly the address in the address register 17 in response to the second coincidence signal. Where the re-circulating loop type of fast access memory is employed, the time at which the second coincidence signal occurs is just prior to the time at which the first word of the transferred block reaches the fast access pickup heads.

With respect to the apparatus of Fig. 1, the pulse generated by the memory control circuits 20 in response to the second coincidence signal may be applied directly to the address register 17 for altering the condition of selected ones of the bi-stable circuits contained therein. Almost immediately thereafter the first word will reach the fast access pickup heads 15 and a coincidence will be established by the registration in the sector counter 12 and the address register 17. In response to a coincidence signal from the coincidence circuit 19 the memory control circuits 20 may be adapted to pass the first word of the transferred block to the D-register 23 via the fast access read gate 22. The normal computational cycle of the apparatus as previously described then may be continued.

In summary, my present invention provides improved apparatus for transferring a block of information from one memory location to another memory location, and automatically provides a registration of the address of a selected word in the memory.

It has been found that a greatly simplified and improved operation results through the use of my invention in apparatus such as a digital computer. Although the invention has been described in connection with a digital computer, I believe that it may be used to advantage in any type of data processing system in which it is desired to transfer a block of information from one memory location to another and derive a selected word immediately after the completion of the block transfer operation.

I claim:

1. Apparatus comprising a command register for storing commands in electrically coded form, the command register including an order register section and an address register section, a magnetic drum having a plurality of storage bands including at least one bulk storage band and at least one fast access band, words including commands and operands being stored in electrically coded form in the bulk storage band at successive sector positions, means for successively deriving the addresses of the sector positions around the drum wherein the words are stored, coincidence means for comparing the address stored in the address section of the command register with each of the successive addresses as derived from the rotating drum, means responsive to a particular order stored in the order section of the command register for transferring a block of words from the bulk storage band to the fast access band following an indication of coincidence by said coincidence means, and means responsive to said particular order in the order section of the command register for modifying the address stored in the address section of the command register to the address of the drum sector in which a preselected word of the block is stored in the fast access band after transfer from the bulk storage band.

2. Apparatus comprising a command register for storing commands in electrically coded form, the command register including an order register section and an address register section, bulk storage means for storing a large number of blocks of words in electrically coded form, fast access storage means for storing a small number of blocks of words in electrically coded form, the words stored in said memory means including commands having address and order digits as part of the words forming the commands, means for successively deriving the addresses of words in the bulk storage memory means and the fast access memory means, coincidence means for comparing the address stored in the address section of the command register with each of the successive addresses, means responsive to a particular order stored in the order section of the command register for transferring a block of words from the bulk storage means to the fast access storage means following an indication of coincidence by said coincidence means, and means responsive to said particular order in the order section of the command register for modifying the address stored in the address section of the command register to the address of a preselected word of the block stored in the fast access storage means after transfer from the bulk storage means.

3. Apparatus comprising high speed memory means and low speed memory means, means for scanning memory locations in the high and low speed memory means, means for deriving an address indication of said memory positions as they are scanned by said scanning means, a command register including an order section and an address section, means responsive to words stored in the command register for transferring new words to the command register from memory locations in the high and low speed memory means, said last-named means including means responsive to a coincidence between the address registered in the address section of the command register and an address indication derived during the scanning of the memory locations, whereby new words are transferred to the command register from memory locations determined by addresses previously stored in the command register, means responsive to a particular order stored in the order section of the command register for transferring a block of words from the low speed memory means to the high speed memory means, said last-named means including means responsive to the address stored in the address section of the command register for selecting the memory locations in the low speed memory means from which said block of words is transferred, and means responsive to said particular order for changing the address stored in the address section of the command register to the high speed memory address of the memory location of the first word in the block transferred to the high speed memory means.

4. In a computer having commands including order information portions and address information portions stored in a high speed memory and a low speed memory and a register to which commands are transferred one at a time from memory locations determined by the address information portion of the previously stored commands in the register, the improvement comprising means responsive to a particular command stored in the register for transferring a block of information from high speed memory to low speed memory, said transferring means including means responsive to the address information portion of said particular command stored in the register for selecting the memory locations in the low speed memory from which the block of information is transferred, and means responsive to the order information portion of said particular command stored in the register for modifying the address information portion of said command stored in the register to correspond to the high speed memory location of a preselected word in the block of information after it is transferred to high speed memory.

5. Apparatus as defined in claim 4 in which the low speed memory and high speed memory comprise separate bands on a single magnetic drum.

6. Apparatus as defined in claim 4 wherein said means for modifying the address portion of the particular command stored in the command register includes an auxiliary register for storing the address portion of the command, and means for changing the number stored in the auxiliary register to the address of the high speed memory location of the first word in the transferred block.

References Cited in the file of this patent

UNITED STATES PATENTS

| | | |
|---|---|---|
| 2,639,859 | Serrell | May 26, 1953 |
| 2,679,638 | Bensky | May 25, 1954 |

OTHER REFERENCES

Publication I entitled "Quick-Access Memory" in Instruments and Automation, March 1954 (page 474) 340–174 (#40).

Publication II entitled "Universal High-Speed Digital Computers: A Magnetic Store," by Williams, Kilburn and Thomas in the Proceedings Inst. Electrical Engr., April 1952 (pages 94, 95, 101 and 102) 340–174.1.